United States Patent Office.

CHARLES VOLKMAR, OF BALTIMORE, MARYLAND.

Letters Patent No. 73,060, dated January 7, 1868.

IMPROVED PAINTER'S CANVAS.

*The Schedule referred to in these Letters Patent and making part of the same.*

TO ALL WHOM IT MAY CONCERN:

Be it known that I, CHARLES VOLKMAR, of the city and county of Baltimore, and State of Maryland, have invented an Improved Mode of Preparing Painter's Canvas; and I do hereby declare that the following is a full, clear, and exact description thereof.

This invention consists in a novel mode of preparing canvas, or other woven fabric or material, so as to adapt it for receiving colors in a dry state, as well as colors prepared with oils or resinous compositions, and also aquatic or methylated fluids, whereby a more permanent fixing of the colors can be secured, and the paint prevented from cracking and peeling off, as will be hereinafter explained.

To enable others skilled in the art to understand my invention, I will proceed to describe it.

I take canvas, or other suitable woven fabric or material, and apply to it any suitable albuminous matter, such, for instance, as the white of eggs, after which the fabric is immersed in boiling water a sufficient length of time to coagulate the albumen, and thereby render it insoluble.

Instead of using the albumen alone, there may be mixed with it, previously to applying it to the fabric or substance to be treated, white lead, or any other pigment which will form a good sizing or foundation upon which to work.

Other modes of coagulating the albumen than that above described may be adopted; and, where it is desired to give the canvas flexibility, glycerine, or any other substance answering the purpose, may be used to advantage.

The canvas thus prepared may be used to receive colors directly upon its surface, or it may be used as a sizing or ground-preparation to receive vegetable oils, resinous compositions, and other substances.

Having thus described my invention, what I claim as new, and desire to secure by Letters Patent, is—

A canvas or other material prepared for receiving colors or other substances by means substantially as herein described.

CHS. VOLKMAR.

Witnesses:
F. KNAPP,
W. P. MYERS.